Patented June 5, 1923.

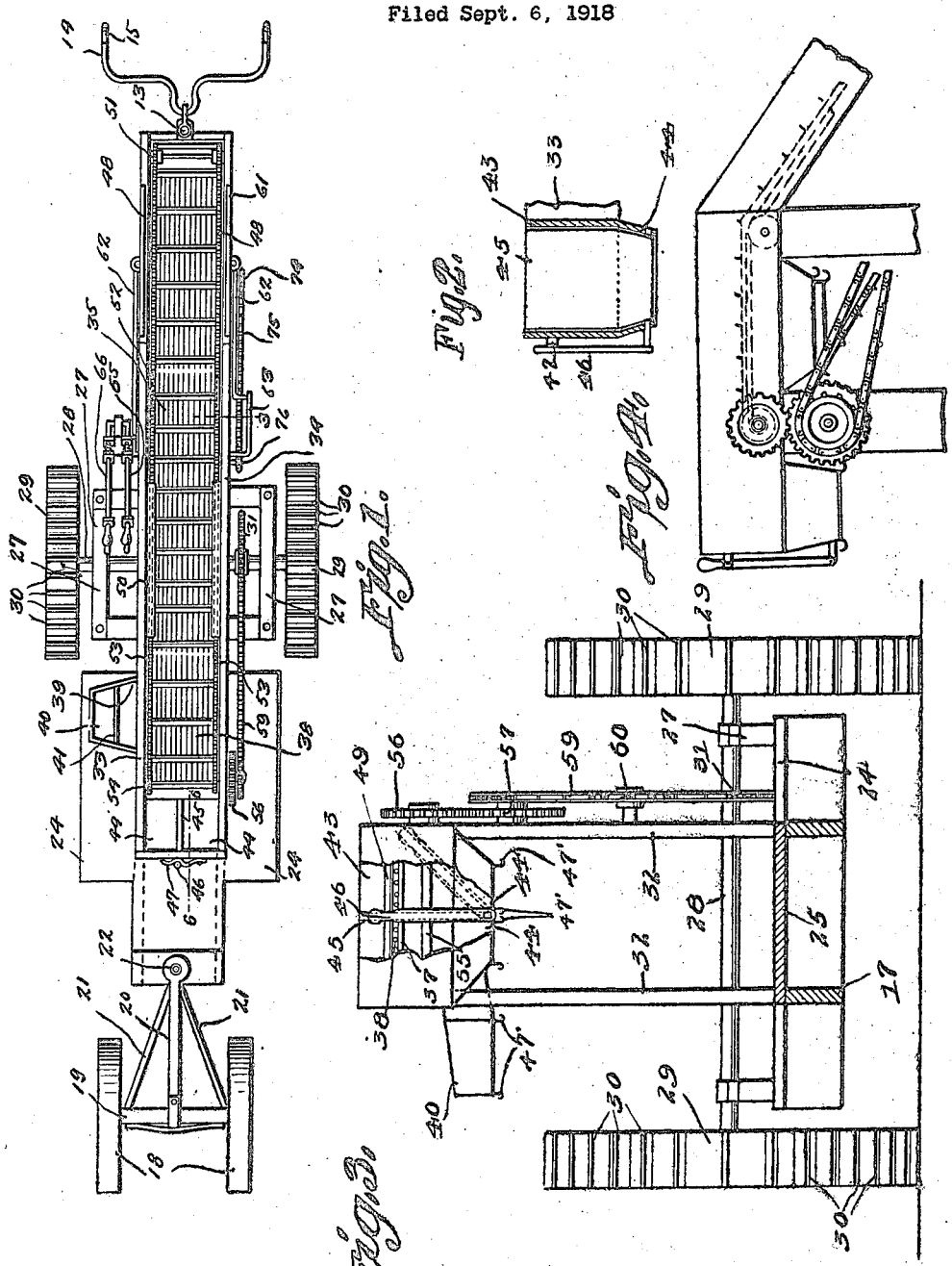

1,458,085

UNITED STATES PATENT OFFICE.

MILTON B. TABOR, OF SWANTON, VERMONT.

POTATO GRADER.

Application filed September 6, 1918. Serial No. 252,880.

*To all whom it may concern:*

Be it known that I, MILTON B. TABOR, a citizen of the United States, residing at Swanton, in the county of Franklin and State of Vermont, have invented new and useful Improvements in Potato Graders, of which the following is a specification.

This invention relates to a potato harvester.

In carrying out my invention it is my purpose to produce means supported on and propelled by a potato digger, whereby to receive potatoes therefrom and elevate the same to suitable hoppers, and during the process of such elevating to remove all dirt and foreign matter therefrom, the hoppers being so arranged and means being associated therewith whereby culls or small potatoes will be delivered to one hopper, the larger sized potatoes to another hopper, and both sizes of potatoes sacked in an easy efficient and expeditious manner.

It is also my purpose to produce a potato picking, cleaning, grading and sacking machine which shall be of a comparatively simple construction, comprising few parts in which the chains for the elevator are housed and protected; one which will not exert undue strain upon the draft animals or the motor for the potato digger, to which the improvement is attached; one which may be manufactured and marketed at a comparatively small cost, and one which will perform the functions for which it is devised with certainty and with accuracy.

Other objects and advantages will appear as the nature of the invention is better understood, reference being had to the accompanying drawings, in which:

Figure 1 is a top plan view of the improvement;

Figure 2 is a sectional view approximately on the line 6—6 of Figure 1;

Figure 3 is a detail rear elevation, parts being broken away and parts being in section, illustrating the manner in which the doors or valves for the rear hopper are operated.

Figure 4 is a detail view of the hopper and chute construction.

The improvement is broadly indicated by the numeral 11, and at the front end thereof has loosely and hingedly secured thereto, as at 13 a substantially U-shaped yoke 14, the parallel arms of which being formed with eyes 15, which is adapted to be suitably secured to a potato digger of ordinary construction. Thereafter I replace the wheels of the axle, securing the same by the usual nuts or cotter pins.

The bed or body of my machine is indicated by the numeral 17, and is arranged close to the ground, being supported at its front end by the potato digger and at its rear end by wheels 18 journaled upon a suitable axle 19 to which is attached a frame comprising a central member 20 and angle side members in the nature of rods 21. The central member 20 has its end pivotally connected as at 22 to the rear of the bed 17, as clearly disclosed by the drawings. The connecting frame between the rear wheels 18 and the bed 17 also includes a lower bar 23 having its free end disposed below the bed 17 and which is connected to the said bed by the pivot 22.

The bed 17, a slight distance inward of the rear end thereof is provided with lateral extensions 24 which provide the platform for the device, and the flooring for the beams providing the bed terminates with the outer edge of the platform. This flooring is indicated for distinction by the numeral 25. The front end of the bed is thus left open, the beams providing the frame therefor being suitably spaced and forming the sides of the bed proper. These sides are, of course, connected at the front and rear portions of the machine as well as by spaced brace members 26 respectively, arranged forward of the platform 24. The plates, comprising the brace members preferably extend a suitable distance beyond the sides of the bed 17 and are connected at their outer ends by cleats 27. These cleats may be in the nature of metallic plates and preferably have their lower edges notched to receive the brace members 26. The cleats or plates 27 have alining openings or may be otherwise provided with bearings for a shaft 28 to the outer ends of which the ground wheels 29 are secured. On the outer surface of the rim of each of the wheels 29 is secured spurs 30 which may be arranged diagonally with respect to the rims, if desired, so that the ground wheels will be afforded a firm grip in the surface over which the machine travels and also whereby both wheels will be revolved in unison.

On the shaft 28 is keyed or otherwise secured a comparatively large gear wheel 31, the purpose of which will presently be apparent.

Arising from the bed centrally and forwardly of the platform 24 are uprights 32 respectively which are arranged in spaced pairs. Secured to the outer sides of the uprights, at the upper portions thereof are boards 33 which provide the sides for the upper and horizontally straight portion of the elevator. To the inner ends of the straight boards 13 are secured additional boards 34 arranged at a downward angle, and these boards provide the sides for the angle portion of the elevator. Between the angle sides 34, adjacent to the bottom thereof is arranged longitudinally arranged spaced bars which provide a grating 35, while upon the horizontal portion of the elevator, which is provided outwardly of the sides 34 by the side beams of the bed 17, is arranged similar plates providing the lower grating 36. The plates providing the gratings 35 and 36 are preferably connected by transverse rods 37 which pass through openings in the said plates, suitable means being arranged on the rods to contact with the opposite sides of the plates to space the latter, and by this means the space between the plates may be readily regulated. The upper horizontal portion of the elevator is provided with a removable grate 38 which rests on suitable cleats or other supports provided between the side boards 33, and the grate 38 is arranged directly over a hopper 39, the same being preferably provided with a chute 40 disposed laterally and angularly with respect to the bed 17, the mouth of the chute being controlled by a suitable valve 41. On the lower portion of the chute 40 are hooks or similar elements 42, whereby a bag or sack may be removably attached to the mouth of the chute. To the rear of the hopper 39 is a second hopper 43, the latter having two downwardly extending chutes or outlet mouths 44 respectively, both of which being normally closed by a valve or door 45. These doors are hinged and are controlled by a lever 46 which may be influenced by a spring dog or contact 47 whereby to hold one of the doors closed and the other open and also whereby to hold both of the doors closed, if desired. The respective chutes 44 are provided with hooks or similar means, indicated by the numerals 47' whereby sacks may be attached thereto. The larger potatoes are delivered into the hopper 43 and through the chutes 44 thereof, the small potatoes passing between the plates providing the grate 38 of the hopper 39, as will be readily understood.

The means for delivering the potatoes to the respective hoppers is in the nature of an elevator, comprising an endless member. The elevator includes spaced chains 48 respectively connected by blades 49. The upper leads of the chains are received in suitable housings 50 secured to the sides of the elevator frame, and preferably in the nature of plates, as disclosed by the drawings. The forward end of the chains is trained over a roller 51 that has its ends provided with trunnions that find bearings in the beams which constitute the sides of the frame 17. The chains are engaged by sprocket wheels 52 provided with short shafts that are journaled in bearings in the sides 34 at the lower ends of the said sides, so that the upper leads of the chains, at what may be termed the inner portion of the elevator are retained substantially horizontally straight. The chains follow the inclined sides 50 and are directed over sprocket wheels 53 that have their shafts journaled in bearings in the side boards 34, and from thence are trained around similar sprocket wheels 54 arranged at the division between the hoppers 39 and 43. On the shafts 55 for the sprocket wheels 54, is secured spur gears 56. One or both of these gears intermesh with a similar gear 57 on a shaft 58 journaled in suitable bearings in the sides 33 of the upper horizontal platform of the elevator. One end of this shaft is projected beyond the side of the elevator on which the main sprocket wheel 31 is arranged, and upon the main sprocket wheel and the referred to smaller sprocket wheel is trained the drive chain 59. The lower lead of this drive chain is engaged by a sprocket wheel 60 which may have its shaft adjustable and which is in the nature of a tightener for the drive chain. By this arrangement it will be noted that when the device is propelled the ground wheels 30 will transfer motion to the elevator which, of course, moves continuously with the turning of the said wheels.

As the potatoes delivered from the digger are liable to pack on the said end of the elevator and consequently roll over the sides of the device, I hingedly secure to the opposite sides of the bed 17, at the said end of the device lead boards or wings 61. The members 61 are of a desired length and are preferably in the nature of a skeleton frame comprising horizontal slats which are suitably connected at the ends thereof. I have found it desirable to provide independent means for swinging either of the wings to a determined angle with respect to the device, and therefore to each of the said wings I loosely connect a rearwardly extending element 62, having their free ends offset and connected to crank members 63 which may be journaled in suitable bearings in inclined sides 34 of the elevator frame. These crank members are connected by links 64 to pivot the levers 65 and 66 respectively. The levers are pivoted to segments 67 and are provided with spring pressed walls 68 that are operated by suitable handle members 69 upon the respective levers. By this arrangement either of the lead members or wings may be arranged at any desired angle and held at such angle.

The forward end of the grate, below the lower horizontal portion of the elevator is separated from the remainder thereof and is hinged, as at 70 between the side members of the bed 17. This hinged portion is indicated for distinction by the numeral 71 and arranged therebeneath is an agitator 72, comprising a beater member journaled upon a suitable shaft 73, the said shaft having secured thereon one or more sprocket wheels 74 around which are trained sprocket chains 75 that in turn are trained around similar sprocket wheels 76 upon a shaft 77. On the said shaft 77 is arranged one or more additional sprocket wheels 78 which mesh with the lower lead of the chains of the elevator, and as a consequence the hinge portion of the grate is constantly agitated so that the dirt from the bodies first delivered to the improvement is thus removed therefrom.

The lower lead of the chains for the elevator are trained around oppositely disposed sprocket wheels 79 and 80 arranged to the rear of the sprocket wheel 52, the said sprocket wheels providing guides for the said leads of the chains and directing the same substantially horizontal to the roller 51.

It is believed, from the foregoing description, when taken in connection with the drawings that the simplicity and advantages of the construction will be apparent without further detailed description. The nature of the invention is such that the same is necessarily susceptible to various modifications, and therefore I hold myself not only to the construction as shown but to all such changes therefrom as fall within the scope of what is claimed.

Having thus described the invention, what is claimed as new, is:—

In a potato grader, the combination of a pair of spaced hoppers, means for delivering potatoes of various sizes thereto, an angularly disposed inclined chute secured to the bottom of one of said hoppers, a valve controlling the outlet of said chute, a depending chute secured to the second hopper, a door pivotally secured centrally and longitudinally of the last mentioned chute dividing the same into two parts, means for operating the door to hold the outlets of the chute wholly opened, partly opened or to close either of the said outlets and to serve as a directing means to the outlet of the other compartment, and a retarding means for the door operating means for holding the door in any of its several positions.

In testimony whereof I affix my signature.

MILTON B. TABOR.